United States Patent
Hirman et al.

(10) Patent No.: US 11,220,796 B2
(45) Date of Patent: Jan. 11, 2022

(54) AUTOMATIC SENSOR CALIBRATION FOR MILLING MACHINES

(71) Applicant: Caterpillar Paving Products Inc., Brooklyn Park, MN (US)

(72) Inventors: Colton J. Hirman, Maple Grove, MN (US); Timothy J. Lindholm, Blaine, MN (US); Eric S. Engelmann, Delano, MN (US)

(73) Assignee: Caterpillar Paving Products Inc., Brooklyn Park, MN (US)

( * ) Notice: Subject to any disclaimer, the term of this patent is extended or adjusted under 35 U.S.C. 154(b) by 0 days.

(21) Appl. No.: 16/902,415

(22) Filed: Jun. 16, 2020

(65) Prior Publication Data

US 2021/0388564 A1    Dec. 16, 2021

(51) Int. Cl.
| | | |
|---|---|---|
| *E01C 23/088* | (2006.01) | |
| *E01C 23/12* | (2006.01) | |
| *G01B 5/06* | (2006.01) | |
| *G01B 11/14* | (2006.01) | |

(52) U.S. Cl.
CPC .......... *E01C 23/088* (2013.01); *E01C 23/127* (2013.01); *G01B 5/061* (2013.01); *G01B 11/14* (2013.01)

(58) Field of Classification Search
CPC ..... E01C 23/088; E01C 23/127; G01B 5/061; G01B 11/14; G05D 1/08; G05D 1/0891; G05D 2201/0202; G05D 2201/021
See application file for complete search history.

(56) References Cited

U.S. PATENT DOCUMENTS

| | | | |
|---|---|---|---|
| 6,152,648 A | 11/2000 | Gfroerer et al. | |
| 8,424,972 B2 | 4/2013 | Berning et al. | |
| 8,899,689 B2 | 12/2014 | Killion | |
| 9,121,146 B2 | 9/2015 | Paulsen et al. | |
| 9,121,148 B2 | 9/2015 | Johnson | |
| 9,206,566 B2 | 12/2015 | Killion | |
| 9,656,530 B2 | 5/2017 | Busley et al. | |
| 10,266,996 B2 | 4/2019 | Hogan et al. | |
| 10,465,346 B2 | 11/2019 | Hoffmann et al. | |
| 2008/0153402 A1* | 6/2008 | Arcona | B24B 7/188 451/352 |
| 2012/0179339 A1* | 7/2012 | Busley | E01C 23/088 701/50 |

(Continued)

*Primary Examiner* — Janine M Kreck
*Assistant Examiner* — Michael A Goodwin
(74) *Attorney, Agent, or Firm* — Schwegman, Lundberg & Woessner (57) ABSTRACT

A milling machine includes a milling rotor, at least one leg, a grade sensor, and a control circuit. The milling rotor is configured to engage a surface beneath the milling machine. The at least one leg is controllable to raise and lower the milling machine. The grade sensor is configured to sense a position indicative of a cut depth of the milling rotor, and the control circuit is configured to receive data from the grade sensor. The control circuit is also configured to: identify a distance from the milling rotor to the surface based on a selected position of the at least one leg; identify a value associated with a detected condition using the grade sensor while the at least one leg is at the selected position; and calibrate the grade sensor by associating the identified distance from the milling rotor to the surface and the identified value.

20 Claims, 6 Drawing Sheets

(56) References Cited

U.S. PATENT DOCUMENTS

| | | | |
|---|---|---|---|
| 2013/0294830 A1* | 11/2013 | Jurasz | E01C 23/127 404/75 |
| 2014/0097665 A1* | 4/2014 | Paulsen | G01B 11/00 299/39.4 |
| 2014/0308075 A1* | 10/2014 | Killion | E01C 23/088 404/84.05 |
| 2020/0407928 A1* | 12/2020 | Berning | E01C 23/088 |

* cited by examiner

AUTOMATIC SENSOR CALIBRATION FOR MILLING MACHINES

TECHNICAL FIELD

The present application relates generally to milling machines. More particularly, the present application relates to automatic calibration of sensing systems for milling machines.

BACKGROUND

Milling machines, such as cold planer machines, include a class of construction machines that are configured to process paving material, such as by scarifying, removing, or reclaiming such material from the surface of a paved road. These machines can include a frame having a rotary cutting tool for processing the paving material, and two or more tracks or wheel units for propelling the cold planer machine forward. The two or more tracks or wheel units can be coupled to the frame of the cold planer using extendable legs or struts that can be adjusted (e.g., extended or retracted) to raise or lower the frame of the cold planer, such as to control the depth at which the cold planer cuts into a surface or road.

U.S. Ser. No. 10/465,346 B2 describes a milling machine with an extendable side plate used in conjunction with one or more sensors to aid in positioning of a milling drum box during operation of the milling machine.

SUMMARY OF THE INVENTION

In one example, a method of calibrating a sensor for a milling machine includes identifying a position of at least one leg of the milling machine; identifying a distance from a milling rotor of the milling machine to a surface beneath the milling rotor using the identified position of the at least one leg; identifying a value associated with a detected condition using a grade sensor of the milling machine while the at least one leg of the milling machine is at the identified position; and calibrating the grade sensor by associating the identified value and the identified distance from the milling rotor to the surface.

In another example, a milling machine includes a milling rotor, at least one leg, a grade sensor, and a control circuit. The milling rotor is configured to engage a surface beneath the milling machine. The at least one leg is controllable to raise and lower the milling machine. The grade sensor is configured to sense a position indicative of a cut depth of the milling rotor, and the control circuit is configured to receive data from the grade sensor. The control circuit is also configured to: identify a distance from the milling rotor to the surface based on a selected position of the at least one leg; identify a value associated with a detected condition using the grade sensor while the at least one leg is at the selected position; and calibrate the grade sensor by associating the identified distance from the milling rotor to the surface and the identified value.

In another example, method of calibrating sensors of a milling machine includes cutting, using a milling rotor of the milling machine, a surface beneath the milling machine; identifying an expected depth of the cutting of the surface beneath the milling machine with respect to an adjacent surface using a first sensor positioned on the milling machine; measuring an actual cut depth of the cutting with respect to the adjacent surface using a second sensor positioned on the milling machine rearward of the milling rotor; and calibrating the first sensor using the actual cut depth measured by the second sensor.

DETAILED DESCRIPTION

Figure 1:
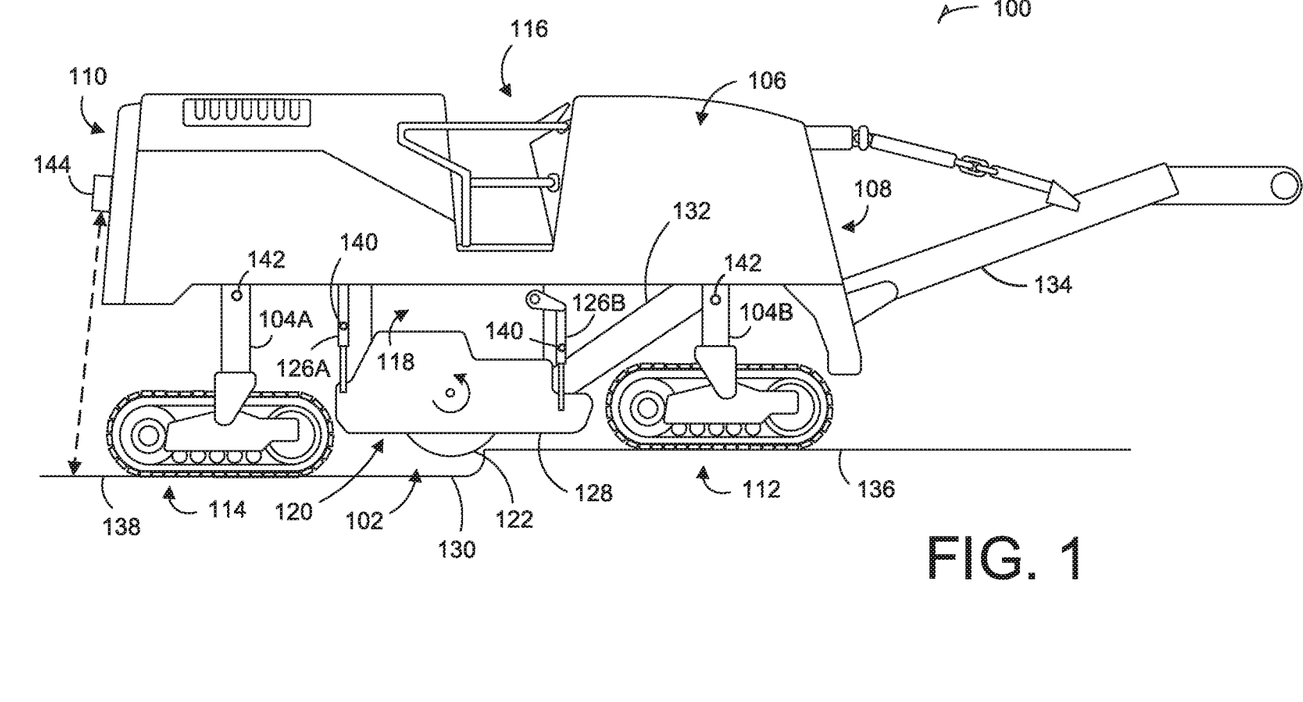
FIG. 1 is a schematic side view of a milling machine.

FIG. 1 is a schematic side view of a cold planer machine 100. The cold planer machine 100 may also be referred to as a milling machine. The cold planer machine 100 includes a cutting system 102, legs 104A and 104B, and a frame 106. While two legs 104A and 104B are visible in FIG. 1, the cold planer machine 100 may include four total legs. The frame 106 includes a front frame end 108 and a back frame end 110. The cold planer machine 100 also includes front propulsion elements 112 and back propulsion elements 114, which can be coupled to frame 106 proximate the front frame end 108 and the back frame end 110, respectively. Each of the propulsion elements 112 and 114 can include two parallel ground engaging tracks, although the present disclosure is not thereby limited. An operator control station 116 can be coupled to frame 106 and can include one or more control systems (shown in FIG. 4) for performing control and monitoring functions of the cold planer machine 100.

The cutting system 102 can be coupled to the frame 106 and can include a housing 118 defining a cutting chamber 120 for a milling rotor 122. The legs 104A and 104B, which may be telescoping or otherwise configured to extend and retract, can be provided to raise and lower the housing 118, including the chamber 120 with the milling rotor 122, typically in conjunction with adjustments to a desired cutting depth of the cutting system 102. Cutting system 102 can include a cutting tool, such as the milling rotor 122, that can rotate in a direction counter to a forward travel direction of cold planer machine 100, for example. The milling rotor 122 can be fixed within the housing 118 and configured to cut material of mat or substrate 130 underlying the cold planer machine 100. The milling rotor 122 may include a plurality of cutting bits mounted thereon, for example, to engage the mat or substrate 130, which may be fragmented by the cutting action of the bits.

Side plate cylinders 126A and 126B can be configured to adjust the height of a side plate 128 by extending and retracting the side plate. While only one side of the cold planer machine 100 is seen in FIG. 1, each side of the cold planer machine may include a respective side plate 128 and side plate cylinders 126A and 126B. The side plates 128 can be in a retracted position or an extended position as controlled by the side plate cylinders 126A and 126B. For example, when the cold planer machine 100 is not in operation, the side plates 128 may be in a retracted position above the milling rotor 122, or in an extended position below the milling rotor.

A primary conveyor 132 can be positioned to feed material cut from the substrate 130 via the milling rotor 122 to a secondary conveyor 134 projecting forward of the front frame end 108. A secondary conveyor 134 can deposit removed substrate 130 into a receptacle, such as the box of a dump truck. The cold planer machine 100 can drive over the substrate 130 such that the front propulsion elements 112 roll on a surface 136. The cold planer machine 100 can be configured to remove the substrate 130 from a roadway to leave a surface 138 behind. The propulsion elements 114 to the rear can roll on the surface 138, with the cutting system 102 producing an edge of substrate 130 between surfaces 136 and 138. Surface 138 can comprise a surface from which paving material has been completely removed or a surface of paving material from which an upper-most layer of paving material has been removed.

The cold planer machine 100 may include a grade and slope system (FIG. 4) used, for example, to control an operator desired cut by the milling rotor 122. Feedback from various sensors may be used as input for the grade and slope system to aid in control and verification of the cut by the milling rotor 122. While described herein with respect to side plates and side plate sensors, the methods and systems described herein may be used for any grade sensors used for grade and slope control including inboard skis, sonic sensors, and the like.

During operation of the cold planer machine 100, the side plates 128 may be moved to an extended position. When in the extended position, side plates 128 may contact the surface adjacent the milling rotor 122 to provide feedback for use by the grade and slope system of the cold planer machine 100, for example. To provide this feedback, the side plate cylinders 126A and 126B may include one or more side plate sensors 140, such as sensing cylinders or other sensors capable of sensing a position or state of the cylinders 126A and 126B to identify a position or state of a respective side plate 128. For example, sensing cylinders may provide an output indicative of a relative position between two telescoping portions of a respective cylinder 126A or 126B, facilitating determination of a position of a respective side plate 128. The sensed data from the side plate sensors 140 may be used by the grade and slope system to verify a desired cut by the milling rotor 122. Other example cold planer machines may use additional and/or alternative grade sensors such as, for example, inboard skis, sonic sensors, and the like.

In conventional operation, calibration of grade sensors, such as the side plate sensors 140, was performed manually. For example, in systems that include side plates for grade and slope sensing, the side plate 128 is lowered to the extended position during manual calibration, and the legs 104A and 104B for a respective side of the cold planer machine 100 are lowered until an operator of the cold planer machine 100 detects that bits of the milling rotor 122 have contacted the surface. This may be accomplished by the operator through seeing and/or hearing the bits of the milling rotor 122 contact the surface. Upon the bits contacting the surface, whatever position the side plate sensors 140 are indicating is calibrated to "zero", or "scratch" height, for the grade and slope system or other control system. The scratch height is then used as a reference by the grade and slope system or other control system during operation of the cold planer machine 100.

It is desirable to automate this process as well as remove the need for the milling rotor 122 to contact the surface for calibration of grade sensors. To accomplish this, the legs 104A and 104B may be controlled to a selected height. This may be accomplished through one or more control inputs located at the operator control station 116, for example. The legs 104A and 104B may include one or more leg sensors 142, such as sensing cylinders, for example, that provide an output indicative of a present position or height of the legs 104A and 104B. Because the milling rotor 122 is fixed to the frame 106 through the housing 118, and the position of the legs 104A and 104B controls the position of the frame 106, a distance from the milling rotor 122 to the surface under the cold planer machine 100 can be identified using the known position of the legs 104A and 104B.

Figure 2:
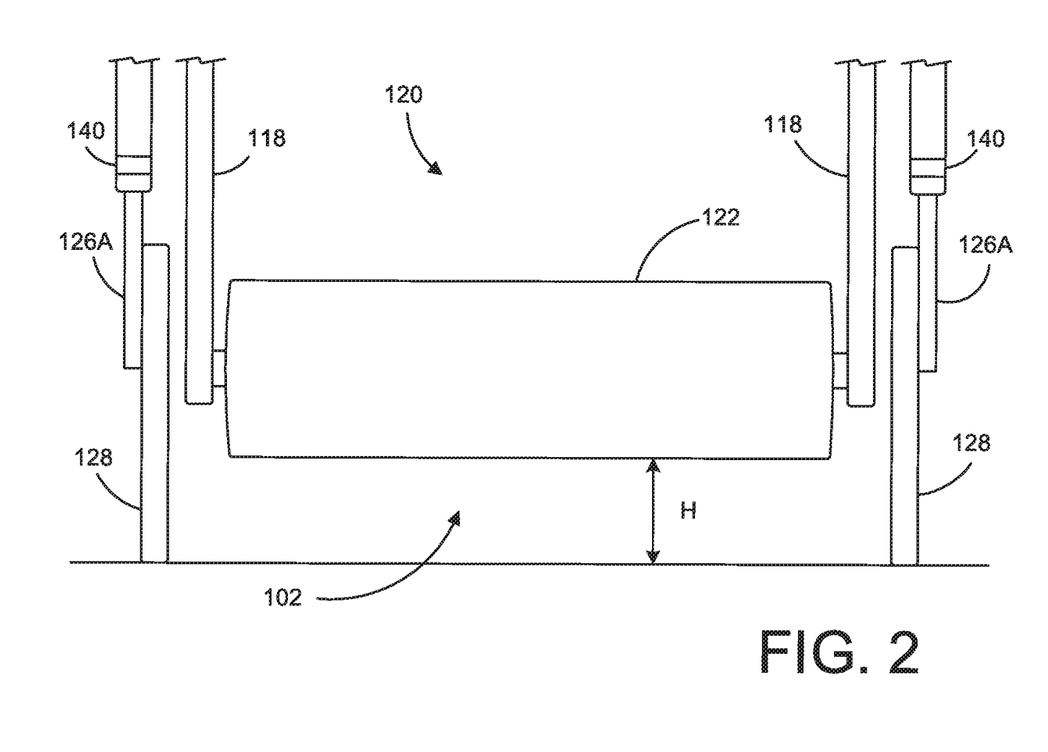
FIG. 2 is a diagram illustrating a milling rotor and side plates with respect to a surface during calibration of a side plate sensor for a milling machine.

FIG. 2 illustrates a rear view of the cutting system 102 during calibration of the one or more grade sensors. In the example illustrated in FIG. 2, the grade sensors are side plate sensors 140. Following control of the legs 104A and 104B to a selected position, and thus the milling rotor 122 to a known position (H) relative to the surface beneath the cold planer machine 100, the side plates 128 can be lowered to the extended state by controlling the respective side plate cylinders 126A and 126B (only side plate cylinders 126A are visible in FIG. 2). The height (H) may be selected such that the side plate 128 will contact the surface in the extended state. Upon lowering the side plate 128 to the extended state, the side plate sensors 140, such as sensing cylinders of the cylinders 126A and 126B can be monitored by one or more control systems of the cold planer machine 100 to detect a condition, such as contact with the surface. For example, while the side plate 128 is extending to the lowered position, a control system of the cold planer machine 100 can detect relative motion of the side plate cylinders 126A and 126B in an opposite direction to detect contact with the ground. In another example, a separate sensor may be positioned on the side plate 128 to detect contact with the ground, such as a sonar sensor, pressure sensor, or other sensor type.

A present position of the side plate cylinders 126A and 126B as indicated by the side plate sensors 140 may be observed upon detection of the condition, such as detection of the side plate 128 contacting the surface. The control system(s) of the cold planer machine 100 may then calibrate the side plate sensors 140 by associating the observed present position to the known height (H). This way, calibration for the side plate sensors 140 can be accomplished automatically and without a need for the milling rotor 122 to contact the surface beneath the cold planer machine 100, allowing calibration over any surface.

Updating the calibration of the grade sensors may also be desirable during cutting operation of the cold planer machine 100. For example, cutting bits of the milling rotor 122 may become worn during cutting (and after initial calibration of the grade and slope control sensors), resulting in an undesired change in cutting depth. In conventional operation, a person may walk behind the cold planer machine 100 and measure a cutting depth with respect to adjacent surfaces using a tape measure, for example. It is desirable to automate re-calibration of the side plate sensors 140 to continuously account for bit wear and other causes of change in cutting depth of the milling rotor 122.

Figure 3:
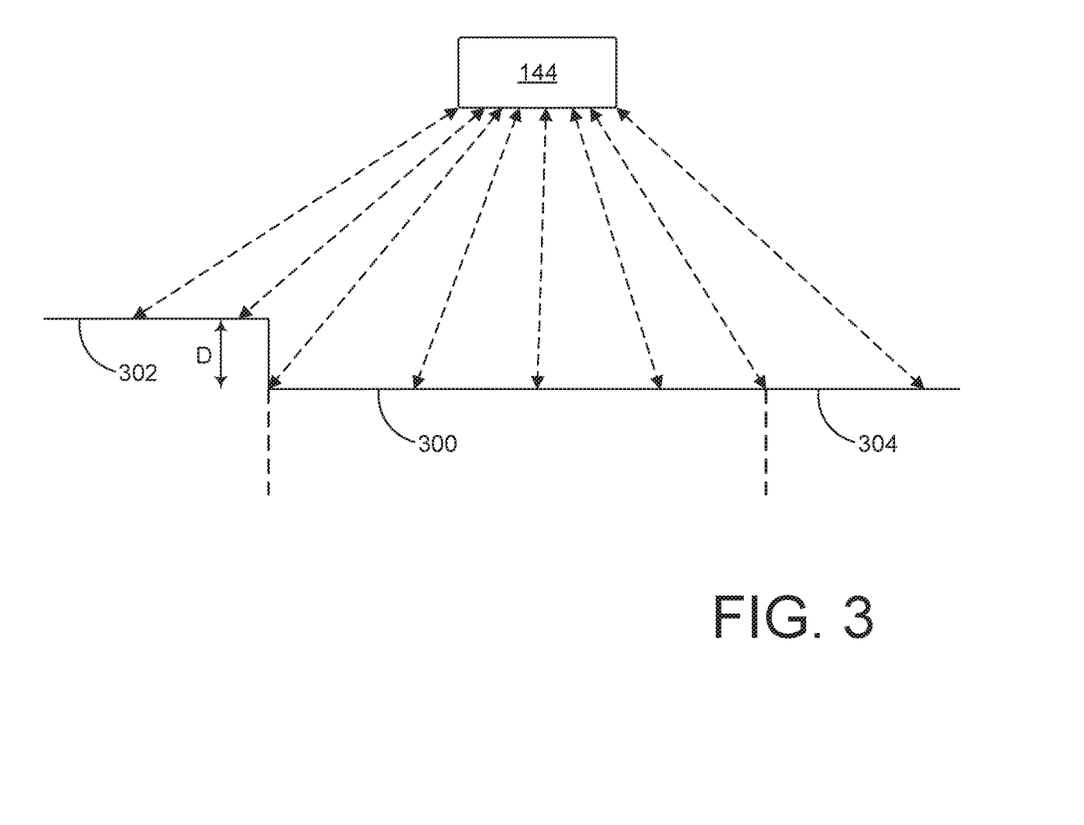
FIG. 3 is a diagram illustrating a sensor assembly configured to identify a cut depth of a cut surface.

FIG. 3 is a diagram illustrating the sensor assembly 144, a cut surface 300, and two adjacent surfaces 302 and 304. While the sensor assembly 144 may be mounted to the frame of the cold planer machine 100, the cold planer machine 100 is not shown in FIG. 3 for simplicity. The cut surface 300 is a surface that has recently been cut by the milling rotor 122 of the cold planer machine 100. The adjacent surface 302 and 304 are surfaces adjacent the cut surface 300 that may or may not have previously been cut, and were not cut at the same time as the cut surface 300. Sensor assembly 144 may be used to identify a cutting depth of the cut surface 300 relative to the adjacent surfaces 302 and 304. In an example, the sensor assembly 144 may be a lidar assembly configured to emit light (illustrated as dashed arrows) in several directions toward the surfaces 300, 302, and 304 and detect light reflected from the surfaces 300, 302, and 304. The relative distances to the surfaces 300, 302, and 304 may be used to determine an actual cut depth by the milling rotor 122 for the cut surface 300. Other sensor assemblies may also be used to determine these distances rearward of the milling rotor 122 such as radar assemblies, ultrasonic sensor assemblies, and the like. While illustrated in FIG. 1 as positioned on the back frame end 110 of the cold planer machine 100, the sensor assembly 144 may be positioned at any location on the frame 106 rearward of the milling rotor 122 and capable of identifying a cut depth of the cut surface 300.

Using the initially calibrated sensor data for the side plate sensor 140 or other grade sensor, an expected cutting depth with respect to adjacent surfaces 302 and 304 may be identified using data from the side plate sensors 140 or other grade sensor. For example, a cut of two inches may be expected and indicated by the side plate sensors 140 with respect to the adjacent surface 302. In another example, a match cut may be performed in which adjacent surface 304, for example, was previously cut and the grade sensor should indicate that the cut depth is zero with respect to the adjacent surface 304. The actual cut depth may be determined using data from the sensor assembly 144 and compared to the cut depth identified by the side plate sensors 140 or other grade sensors. For example, for the adjacent surface 302, if the actual cut depth (D) differs from the identified cut depth, the side plate sensors 140 or other grade sensors can be recalibrated using the actual cut depth (D). This may be performed as frequently as is desirable during operation of the cold planer machine 100 and eliminates the need for an operator to walk behind the cold planer machine 100 and manually measure cut depth.

Figure 4:
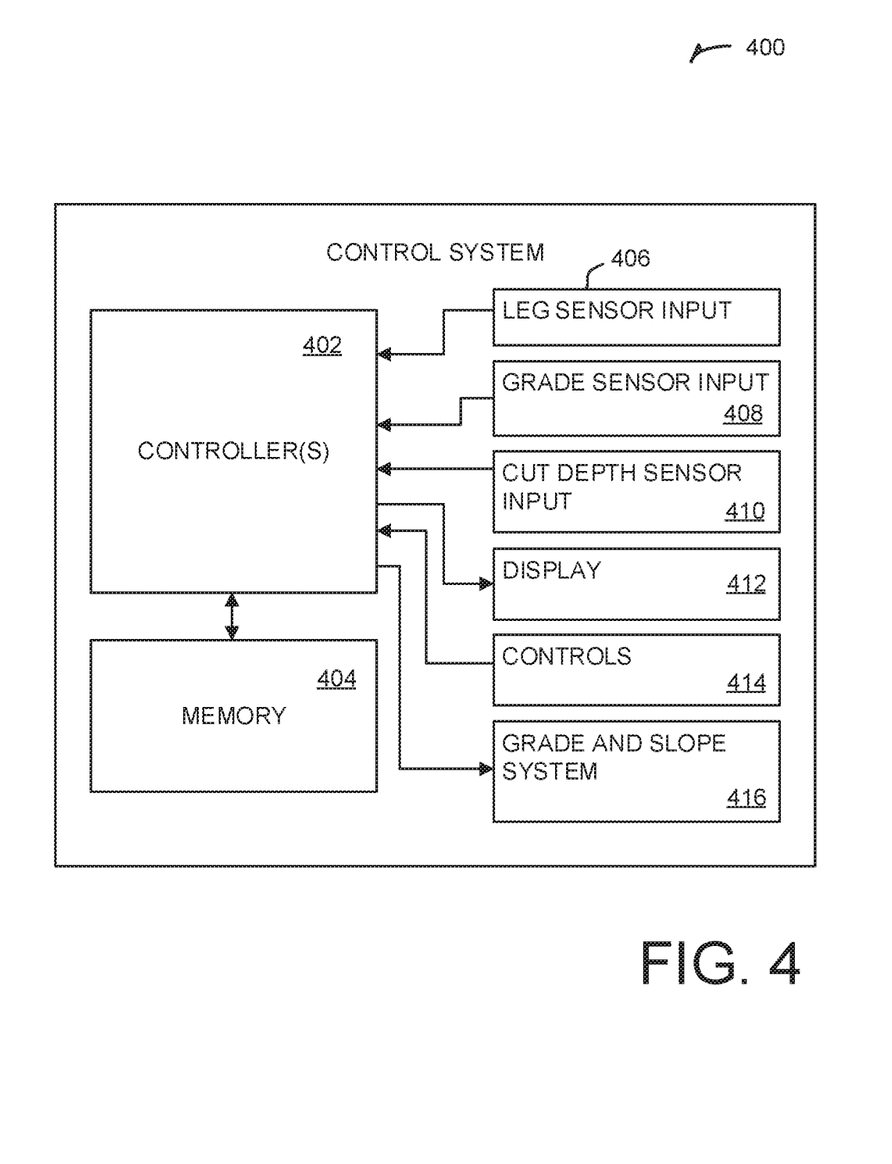
FIG. 4 is a block diagram illustrating a control system for a milling machine.

FIG. 4 is a block diagram illustrating a control system 400 for a cold planer machine, such as the cold planer machine 100. The control system 400 includes one or more controllers 402, memory 404, leg sensor input 406, grade sensor input 408, cut depth sensor input 410, display 412, controls 414, and grade and slope system 416. The controls 414 can be operated by an operator positioned at the operator control station 116, such as to control the operation of the cold planer machine 100, as well as the height/position of both the legs 104A and 104B and the side plates 128. The display 412 or other output device can also be positioned at the operator control station 116 to provide output to an operator. In an example, the controls 414 and the display 412 may be a single device, such as a touchscreen, for example.

The controller 402 and memory 404 can include, for example, software, hardware, and combinations of hardware and software configured to execute several functions related to control of the cold planer machine 100. The controller 402 can include an analog, digital, or combination analog and digital controller including a number of components. As examples, the controller 402 can include integrated circuit boards or ICB(s), printed circuit boards PCB(s), processor(s), data storage devices, switches, relays, or any other components. Examples of processors can include any one or more of a microprocessor, a controller, a digital signal processor (DSP), an application specific integrated circuit (ASIC), a field-programmable gate array (FPGA), or equivalent discrete or integrated logic circuitry.

The memory 404 may include storage media to store and/or retrieve data or other information such as, for example, signals from the side plate sensors 140, leg sensors 142, and/or sensor assembly 144. Storage devices, in some examples, are described as a computer-readable storage medium. The memory 404 can be used to store program instructions for execution by processor(s) of the controller 402, for example. The memory 404, for example, are used by software, applications, algorithms, as examples, running on and/or executed by the controller 402. The memory 404 can include short-term and/or long-term memory and can be volatile and/or non-volatile. Examples of non-volatile storage elements include magnetic hard discs, optical discs, floppy discs, flash memories, or forms of electrically programmable memories (EPROM) or electrically erasable and programmable (EEPROM) memories. Examples of volatile memories include random access memories (RAM), dynamic random access memories (DRAM), static random access memories (SRAM), and other forms of volatile memories known in the art.

The leg sensor input 406 may be derived from or configured to provide sensed data from one or more of the legs 104A and 104B, such as the leg sensors 142, for example. The grade sensor input 408 may be derived from or configured to provide sensed data from one or more grade sensors, such as the side plate sensors 140. The cut depth sensor input 410 may be derived from or configured to provide sensed data from the sensor assembly 144. The controller 402 may use these inputs to carry out the methods of calibrating the side plate sensor 140, for example, as discussed herein.

The calibrated values for the side plate sensors 140 may be stored by the memory 404 and/or provided to the grade and slope system 416. The grade and slope system 416 may be configured to provide control for the legs 104A and 104B to obtain a desired cut by the milling rotor 122. The grade and slope system 416 may use the calibrated value for the side plate sensors 140 to verify a correct cutting depth on each side of the cold planer machine 100, for example.

INDUSTRIAL APPLICABILITY

Figure 5:
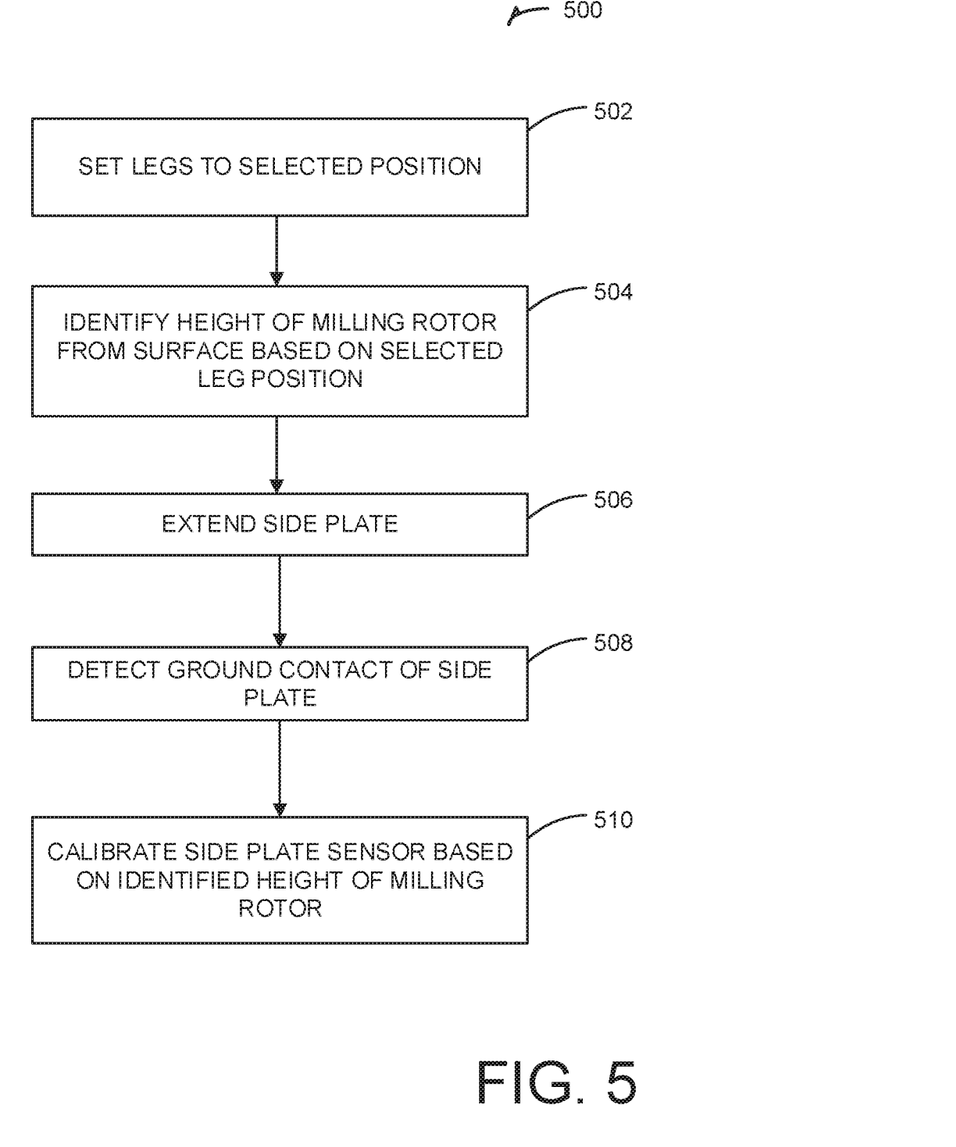
FIG. 5 is a flowchart illustrating a method of initially calibrating a side plate sensor for a milling machine.

In one illustrative example, the cold planer machine 100 may be a Caterpillar® X PM622 cold planer machine. FIG. 5 is a flowchart illustrating an example method 500 of calibrating a grade sensor for the cold planer machine, such as a side plate sensor. Method 500 may be executed by one or more control systems of the cold planer machine, such as the control system 400 illustrated in FIG. 4. At step 502, the legs of the cold planer machine are controlled to a selected height. This may be performed on a relatively flat surface such that all four legs may be controlled to the same height. At step 504, one or more leg sensors, such as sensing cylinders, may be used to verify the height of each leg. Once this height is verified, the distance from the milling rotor to the surface beneath the milling rotor may be determined.

At step 506, the side plates of the cutting system of the cold planer are extended until they contact the ground. At step 508, a condition is detected such as ground contact of the side plates. This may be accomplished using sensing cylinders in one or more side plate cylinders to detect relative motion caused by ground contact, or may be accomplished using one or more contact sensors, such as a sonar sensor, or any other sensor capable of sensing data indicative of ground contact. At step 510, upon detection of the condition, the known height of the milling rotor from the surface behind the milling rotor, as determined at step 504, can be used to calibrate the grade sensor, such as the side plate sensor, by associating a value identified for the grade sensor, such as a present position the side plate with the known height of the milling rotor above the surface. This way, the grade sensors can be initially calibrated automatically, eliminating the need for one or more persons to manually calibrate the sensors, and removing the need for the milling rotor to contact the surface during calibration of the sensors.

Figure 6:
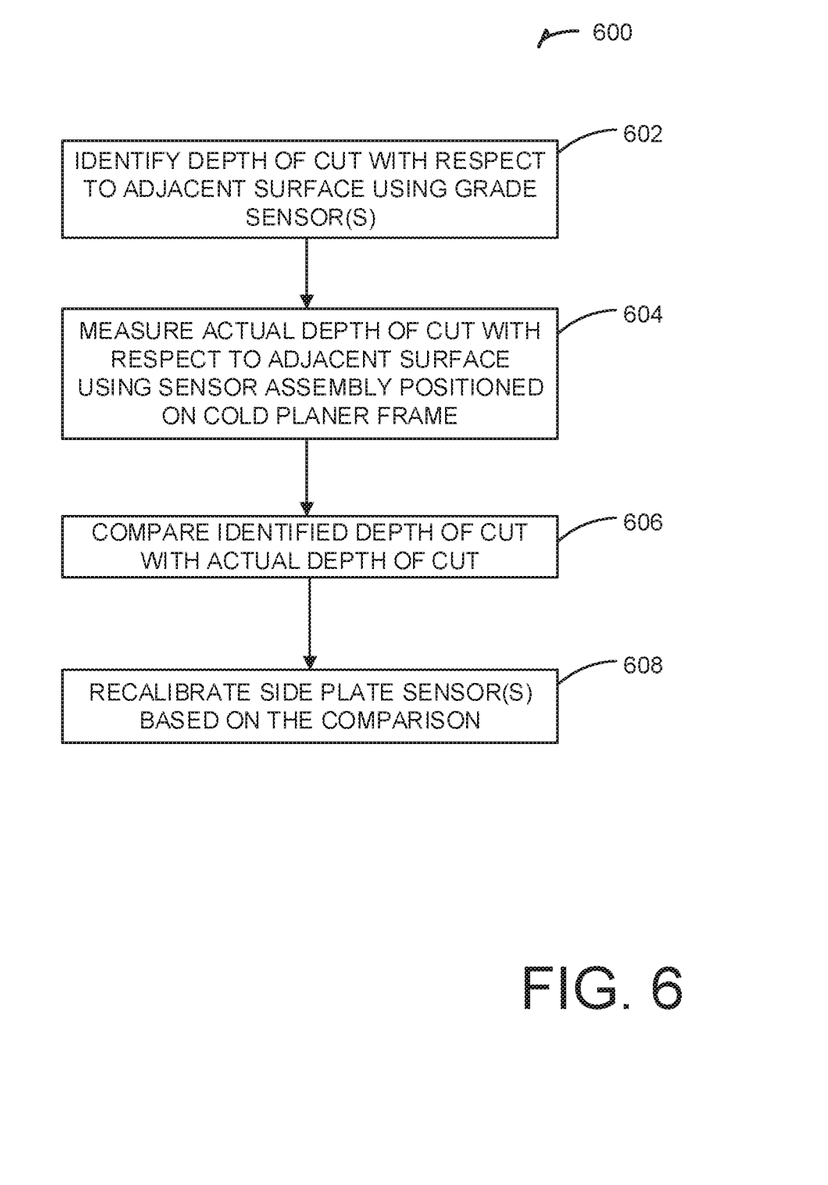
FIG. 6 is a flowchart illustrating a method of continuously calibrating a side plate sensor for a milling machine.

FIG. 6 is a flowchart illustrating a method 600 of automatically recalibrating one or more grade sensors, such as side plate sensors, during operation of the cold planer machine. Method 600 may be executed by one or more control systems of the cold planer machine, such as the control system 400 illustrated in FIG. 4. At step 602, a cut depth of a cut surface is identified using one or more grade sensors, such as a sensing cylinder of one or more side plate cylinders of the cold planer machine. The cut depth may be identified with respect to a surface adjacent the cut surface. At step 604, a sensor assembly, such as a lidar assembly affixed to the frame of the cold planer machine, is used to identify an actual cut depth with respect to the surface adjacent the cut surface. In an example, this may be achieved by identifying a vertical distance to the cut surface beneath the milling machine and a vertical distance to the adjacent surface. The adjacent surface may be a previously cut or uncut surface. For example, in the case of a match cut, the identified vertical distance to the cut surface and the identified vertical distance to the adjacent surface should equal. At step 606, the identified cut depth is compared to the actual cut depth. If the actual cut depth differs from the identified cut depth, then at step 608, the grade sensor(s) can be recalibrated to correct any error that has occurred during operation of the cold planer machine, such as wearing of the bits of the milling rotor. This way, the grade sensors can be automatically calibrated, eliminating the need for one or more persons to manually calibrate the sensor during operation of the cold planer machine.

The above detailed description is intended to be illustrative, and not restrictive. The scope of the disclosure should, therefore, be determined with references to the appended claims, along with the full scope of equivalents to which such claims are entitled.

What is claimed is:

1. A method of calibrating a sensor for a milling machine, the method comprising:
    identifying a position of at least one leg of the milling machine;
    identifying a distance spacing a milling rotor of the milling machine from a surface beneath the milling rotor using the identified position of the at least one leg;
    sensing a contact of a side plate of the milling machine with the surface while the at least one leg of the milling machine is at the identified position; and
    calibrating a grade sensor by associating the identified contact and the identified distance from the milling rotor to the surface.

2. The method of claim 1, wherein a side plate sensor is coupled to the side plate of the milling machine, and wherein sensing the contact comprises:
    extending the side plate adjacent the milling rotor; and
    identifying, using the side plate sensor, a sensed position of the side plate upon contact of the side plate with the surface.

3. The method of claim 2, wherein identifying the sensed position of the side plate comprises identifying the position of the side plate using at least one side plate sensing cylinder of the side plate.

4. The method of claim 2, wherein the side plate is a first side plate and the side plate sensor is a first side plate sensor, and wherein the method further comprises:
    extending a second side plate adjacent the milling rotor and opposite the first side plate;
    detecting contact of the second side plate with the surface;
    identifying, using a second side plate sensor, a sensed position of the second side plate; and
    calibrating the second side plate sensor by associating the sensed position of the second side plate and the identified distance from the milling rotor to the surface.

5. The method of claim 1, further comprising:
    cutting, using the milling rotor of the milling machine, a cut surface;
    identifying an expected depth of the cut surface with respect to an adjacent surface using the grade sensor;
    measuring an actual cut depth of the cut surface with respect to the adjacent surface using a sensor positioned on the milling machine; and
    recalibrating the grade sensor based on the actual cut depth and the expected depth.

6. The method of claim 5, wherein measuring an actual cut depth comprises measuring the actual cut depth using a lidar assembly attached to a frame of the milling machine.

7. The method of claim 1, further comprising:
    controlling the at least one leg of the milling machine to a selected position prior to identifying the position of the at least one leg;
    wherein identifying the position of the at least one leg comprises identifying the position of the at least one leg using at least one sensing cylinder of the at least one leg.

8. A milling machine comprising:
    a milling rotor configured to engage a surface beneath the milling machine;
    at least one leg controllable to raise and lower the milling machine;
    a grade sensor configured to sense a position indicative of a cut depth of the milling rotor; and
    a control circuit configured to receive data from the grade sensor, the control circuit configured to:
        identify a distance spacing the milling rotor from the surface beneath the milling rotor based on a selected position of the at least one leg;
        sensing a contact of a side plate of the milling machine with the surface while the at least one leg is at the selected position; and
        calibrate a grade sensor by associating the identified distance from the milling rotor to the surface and the identified contact.

9. The milling machine of claim 8, wherein a side plate sensor acts as the grade sensor, and wherein the milling machine comprises:
    the side plate extendable to contact the surface beneath the milling machine adjacent to the milling rotor;
    wherein the control circuit is further configured to detect contact of the side plate with the surface and identify a sensed position of the side plate using the side plate sensor.

10. The milling machine of claim 9, wherein the side plate is a first side plate and the side plate sensor is a first side plate sensor, and wherein the milling machine further comprises:
    a second side plate extendable to contact the surface beneath the milling machine adjacent to the milling rotor and opposite the first side plate; and a second side plate sensor configured to sense a position of the second side plate, wherein the control circuit is further configured to:

receive input from the second side plate sensor; and calibrate the second side plate sensor by associating the identified distance from the milling rotor to the surface and the sensed position of the second side plate.

11. The milling machine of claim 9, further comprising a side plate cylinder configured to raise and lower the side plate, and wherein the side plate sensor is a sensing cylinder connected to the side plate.

12. The milling machine of claim 8, further comprising:

a leg sensor configured to sense the selected position of the at least one leg, wherein the controller is configured to identify the distance from the milling rotor to the surface using the sensed position of the at least one leg.

13. The milling machine of claim 12, wherein the leg sensor is a sensing cylinder configured to sense a value indicative of the position of the at least one leg.

14. The milling machine of claim 8, further comprising a sensor assembly positioned on the milling machine, wherein the control circuit is further configured to:

identify an expected depth of a cut of the surface using the grade sensor with respect to an adjacent surface;

determine an actual depth of the cut with respect to the adjacent surface using the sensor assembly; and recalibrate the grade sensor based on the actual depth and the expected depth.

15. The milling machine of claim 14, wherein the sensor assembly is a lidar assembly configured to emit light to identify distances to the cut surface and the adjacent surface.

16. A method of calibrating sensors of a milling machine, the method comprising:

cutting, using a milling rotor of the milling machine, a surface beneath the milling machine;

identifying an expected depth of the cutting of the surface beneath the milling machine with respect to an adjacent surface using a first sensor comprising a side plate sensor positioned on a side plate of the milling machine adjacent the milling rotor;

measuring an actual cut depth of the cutting with respect to the adjacent surface using a second sensor positioned on the milling machine; and calibrating the first sensor using the actual cut depth measured by the second sensor.

17. The method of claim 16, wherein measuring the actual cut depth comprises measuring the actual depth with respect to the adjacent surface using a lidar assembly attached to a frame of the milling machine and configured to emit light toward the cut surface and the adjacent surface.

18. The method of claim 16, wherein identifying the expected depth of the cutting of the surface comprises sensing a position of the side plate using the side plate sensor.

19. The method of claim 18, wherein prior to cutting the surface, the method further comprises:

identifying a distance spacing a milling rotor of the milling machine from a surface beneath the milling rotor using an identified position of at least one leg of the milling machine;

extending the side plate toward the surface;

detecting contact of the side plate with the surface;

identifying, using the side plate sensor, a sensed position of the side plate in response to detection of the contact of the side plate with the surface; and initially calibrating the side plate sensor by associating the sensed position of the side plate and the identified distance from the milling rotor to the surface.

20. The method of claim 19, wherein prior to identifying the distance from the milling rotor to the surface, the method further comprises controlling the at least one leg of the milling machine to a selected position.

* * * * *